United States Patent [19]

Taiani et al.

[11] 4,184,090

[45] Jan. 15, 1980

[54] ROTARY MAGNETIC ISOLATION COUPLING

[75] Inventors: Patrick M. Taiani, Jollymore; El-Sayed M. Marzouk, Halifax, both of Canada

[73] Assignee: Nova Research Foundation Corporation, Nova Scotia, Canada

[21] Appl. No.: 841,934

[22] Filed: Oct. 13, 1977

[51] Int. Cl.² ............................................. H02K 49/10
[52] U.S. Cl. ..................................... 310/104; 417/420
[58] Field of Search ................. 310/103, 104, 105, 60, 310/62, 63; 417/420

[56] References Cited

U.S. PATENT DOCUMENTS

| 2,847,936 | 8/1958 | Richter | 310/104 X |
| 3,520,642 | 7/1970 | Fulton | 310/104 X |
| 3,860,064 | 1/1975 | Murphy | 310/104 X |

*Primary Examiner*—Donovan F. Duggan
*Attorney, Agent, or Firm*—Roylance, Abrams, Berdo & Farley

[57] ABSTRACT

A magnetic drive for coupling mechanical power to the interior of a high pressure vessel is disclosed. The drive includes an output or driven portion including a nonmagnetic housing hermetically sealed to a wall of the vessel and containing an output shaft which extends into the vessel. The shaft is mounted for rotation in bearings contained within a cylindrical extension of the housing projecting into the vessel interior. The opposite end of the shaft carries a plurality of permanent magnet segments coaxial therewith and is located within a high pressure gas barrier of the housing external of the vessel. Input power is provided by an input shaft connected to a power source, the input shaft carrying a housing which is coaxial to the gas barrier and has permanent magnets therein which will interact with the output shaft magnets upon rotation of the input shaft to cause rotation of the output shaft. Integrally formed in the input housing is a centrifugal blower which will draw air along the gas barrier during rotation of the input shaft to provide cooling therefor. The structure is compact, is able to cool the entire gas barrier and keeps the formation of eddy currents and their inherent losses to a minimum.

12 Claims, 3 Drawing Figures

ROTARY MAGNETIC ISOLATION COUPLING

The present invention relates particularly to a magnetic drive for coupling mechanical power from the exterior to the interior of a high pressure vessel.

BACKGROUND OF THE INVENTION

There are many uses for vessels which may be required to withstand high internal pressures, say up to 5000 p.s.i., whether in the laboratory or in industry. One example is a decompression chamber for deep-sea divers, which chamber requires a power source to operate equipment therein, such as rotary gas pumps for circulating the breathing gas mixture through chemical carbon dioxide scrubbers to remove the carbon dioxide. For safety reasons it is not practical to use electric motors within the chamber and hence an external drive for motors within the chamber is required. Hermetically sealed drives using electric motors wherein the driven shaft projects through an opening in the chamber wall and is held in a pressurized zone have been utilized (see our Canadian patent application Ser. No. 226,097 filed May 2, 1975). Other types of external drives have been utilized, for example drives where the input shaft (external) is magnetically coupled to the output shaft (internal). Such drives have not been completely satisfactory since it is necessary to use a high pressure gas barrier between the input and output magnets and, when a metallic barrier to withstand the high pressures is used, eddy currents are set up which can cause substantial heating of the barrier and attendant losses in efficiency of the magnetic coupling. Additional cooling is therefore required for the gas barrier and in the past it has been necessary to provide add-on blowers or fans for the magnetic interface.

SUMMARY OF THE INVENTION

The present invention provides a magnetic drive coupling which overcomes most of the problems of the prior art. An output shaft is mounted within the pressure vessel in a cantilevered manner on small, low-loss bearings and has a portion thereof extending exteriorly of the vessel to carry a plurality of magnets thereon. A gas barrier hermetically sealed to the vessel and formed of a high electrical volume resistivity metal envelops completely the extended portion of the output shaft and the magnets carried thereby. An input shaft connected to a power source is aligned with the output shaft and carries a cup-like housing having a plurality of drive magnets therein surrounding the gas barrier and aligned with the output magnets whereby rotation of the input shaft will cause rotation of the output shaft through magnetic interaction. The housing is also integrally provided with a centrifugal blower structure which draws ambient air along the surface of the gas barrier in the gap between the barrier and the drive magnets to provide cooling of the barrier.

Thus the present invention provides definite advantages over known drive systems. It first of all keeps eddy currents and their attendant losses to a minimum by utilizing a particular type of gas barrier. It further keeps the gas barrier cool by providing an integral cooling system which will supply cooling air to the barrier whenever thr drive system is operating. And the use of a cantilever mounting for the output shaft permits the use of samll, low loss bearings and enables the entire gas barrier to experience the cooling air flow. The present invention therefore exhibits advantages in cost, safety, efficiency and size over known driven systems.

Broadly speaking the present invention may be defined as a magnetic drive for coupling input power to the interior of a high pressure vessel having an external wall, comprising an output shaft extending through an opening in the wall, means for supporting one end of the shaft within the vessel, a plurality of permanent output magnets on the other end of the shaft exterior to the vessel, a high pressure gas barrier having high electrical volume resistivity, the barrier being hermetically sealed to the vessel wall and enveloping the other end of the shaft and the output magnets, an input shaft axially aligned with the output shaft, an annular cup-shaped housing member fixed to the input shaft, surrounding the gas barrier and carrying a plurality of permanent drive magnets therein aligned with the output magnets and radially spaced from the barrier, and a centrifugal blower arrangement integral with the housing member and operative to draw air through the space between the drive magnets and the barrier to cool the barrier.

DESCRIPTION OF THE PREFERRED EMBODIMENT

Figure 1:
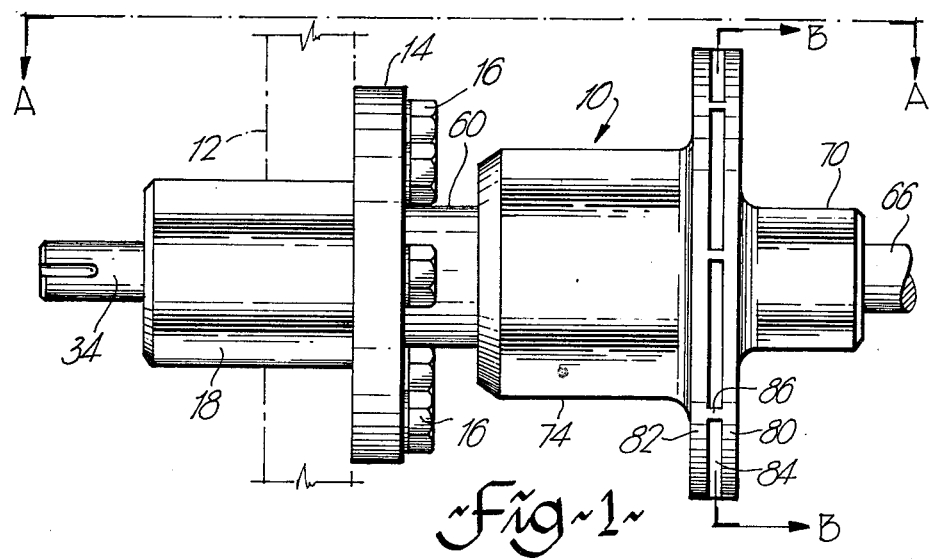
FIG. 1 shows an elevational view of the magnetic coupling of the present invention.
Figure 2:
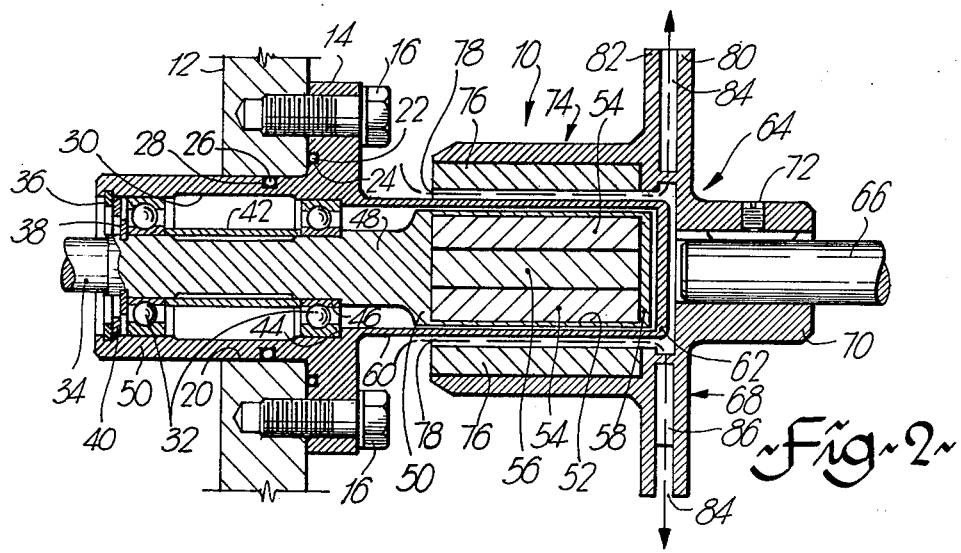
FIG. 2 shows an axial section along the line A—A of FIG. 1.

FIG. 1 illustrates the rotaty magnetic coupling 10 of the present invention in position on the wall 12 of a high pressure vessel. As is commonly known a main flange 14 is attached to the wall 12 by a plurality of equally spaced bolts 16. As seen in FIGS. 1 and 2 a cylindrical housing portion 18 extends coaxially from the flange 14, and passes through an opening 20 in wall 12 so as to terminate within the pressure vessel. O-ring seal 22 is placed in an annular recess 24 in flange 14 so as to abut the outer face of wall 12 when the flange is bolted thereto, and a second O-ring seal 26 is positioned in a circumferential recess 28 in opening 20 so as to abut the outer periphery of the cylindrical portion 18 when it is located in the opening 20. Seals 22 and 26 aid in sealing the interior of the pressure vessel from the exterior thereof. Thus the combination of flange 14 and cylindrical portion 18 may be seen to form a bushing.

Cylindrical portion 18 is hollow, having an axially directed bore 30 therein. A pair of axially spaced bearings 32 are positioned within bore 30 so as to bearingly support a shaft 34 within the bore 30. Shaft 34 projects from the open end of bore 30 into the interior of the pressure vessel for connection to whatever equipment is to be rotated thereby. Circlips 36, 38 and packing 40 are conventionally located within bore 30 adjacent the bearing 32 closest the open end of bore 30 to prevent any dirt or debris from fouling the bearings and to prevent movement of the bearings from within bore 30. A sleeve 40 is positioned between the bearings 32,32 to maintain the bearings in their proper positions within the bore 30, relative to the shaft 34. In that respect it is noted that shaft 34 is provided with an annular shoulder 44 amd circumferential seats 46,46 for proper positioning of the bearings. Shaft 34 should be formed of a non-magnetic material and depending on the application it should be non-corrosive. Stainless steel (e.g. type 316) is very suitable.

Shoulder 44 is formed by a portion 48 of shaft 34 having a larger diameter that the portion mounting the bearings 32,32. The enlarged diameter portion in turn is connected to cup-shaped member 50 which is slightly smaller in diameter than the diameter of bore 30. Portion 50 is provided with a blind bore 52 in which are positioned a plurality of circumferentially spaced rotor magnet segments 54 (preferably of a rare earth type such as samarium cobalt) axially oriented to have one pole adjacent the end of shaft 34 and the opposite pole adjacent the transition between portions 48 and 50. A locating member 56 is positioned axially in bore 52 to orient and locate the magnets 54 in position. Cup member 50 is closed by an end cap 58, made from the same material as shaft 34, to hermetically seal the rotor magnet segments.

Extending outwardly from flange 14 and coaxial with shaft 34 is a cylindrical housing portion 60, the interior of which defines bore 30. Housing portion 60 is closed by the end portion 62 which is located in close juxtaposition to the end cap 58. Housing 60,62 acts as a high pressure gas barrier and should be formed from a metal having a high electrical volume resistivity. This allows the formation of eddy currents and their inherent losses to be held to a minimum. Typically the barrier can be made from titanium, nichrome, hastalloy or stainless steel depending on the application. Needless to say housing 60,62, flange 14 and cylindrical portion 18 could be machined as an integral shaft enclosure from a unitary piece of the appropriate metal although ecomonics would probably dictate that it be a separate piece hermetically sealed to the flange 14 or the wall 12.

Drive for the rotor and its shaft 34 is provided by a rotary drive unit 64 having an input shaft 66 connected to a rotary source (not shown) such as an electric or hydraulic motor. An aluminum generally cup-shaped housing 68 having a cylindrical shaft portion 70 is keyed to input shaft 66 for rotation therewith. A set screw 72 is also provided to lock the housing 68 to the shaft 66.

Housing 68 has two portions of enlarged diameters positioned between the shaft portion 70 and flange 14 mounted to vessel wall 12. The first enlarged portion 74 is an annular cylindrical section provided in its interior with a circumferentially spaced plurality of permanent magnet segments 76 (rare earth type) axially directed and located so as to be radially outward of magnets 54 such that the magnetic lines of force between magnets 54 and 76 will cause rotation of shaft 34 upon rotation of input shaft 66. As can be seen from FIG. 2 there is an annular gap 78 between the magnets 76 and the gas barrier 60.

Figure 3:
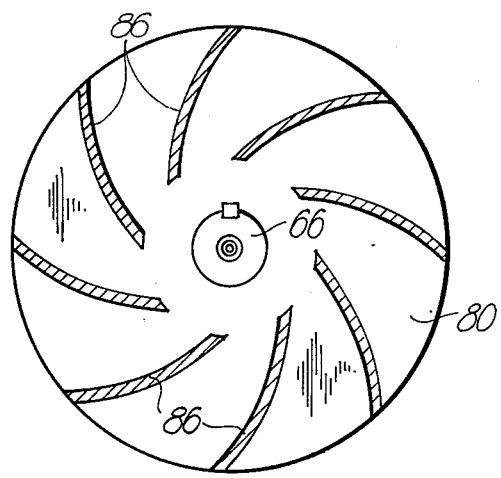
FIG. 3 shows a transverse section along the line B—B of FIG. 1.

The second enlarged diameter portion is best portrayed in FIGS. 2 and 3. As seen in FIG. 2, the adjacent ends of portions 70 and 74 merge into radially outwardly directed circular flanges 80 and 82 respectively, the flanges being separated from each other by a gap 84. Located within the gap and affixed to each of the flanges is a plurality of circumferentially spaced identical outwardly spirally directed vanes 86, each vane having its inner end spaced radially outwardly from the inner face of the magnets 76 and having its outer end at the periphery of the flanges 80, 82. As is seen most readily in FIG. 3, the flanges 80, 82 and the vanes 86 cooperate to form a centrifugal blower.

The operation of the invention has been previously discussed with respect to the magnets 76, it being noted that the magnets 76, 54 couple, magnetically, the input shaft 66 to the output shaft 34. During high speed operation, however, eddy currents, although minimized by the material of barrier 60, still occur within the gas barrier 60, and heat is generated therein. By providing the centrifugal blower formed by flanges 80, 82 and vanes 86, ambient air can be induced to flow along the barrier 60 through the gap 78 and out through the blower between the flanges 80, 82. This flowing air will cool the gas barrier and permit the high speeds that may be required. The centrifugal blower is integral with the structure housing the drive magnets and hence a compact and relatively inexpensive cooling means is provided.

The above description relates to a specific embodiment of the present invention and it is recognized that others skilled in the art to which the invention pertains could modify the structure while maintaining the essence of the invention. The scope of protection to be accorded the present invention should therefore be determined from the appended claims.

The embodiments of the present invention in which an exclusive property or privilege is claimed are defined as follows:

1. A magnetic drive coupling for a high pressure vessel with an external wall, comprising
   a first shaft;
   first support means for supporting one end of said first shaft within the vessel;
   a first plurality of permanent magnets on the other end of said first shaft, said other end of said first shaft extending through an opening in the vessel exterior wall;
   a high pressure gas barrier means of high electrical volume resistivity hermetically sealed to the vessel exterior wall and enveloping said first shaft other end and said first magnets for sealing said first magnets and said first shaft other end within the vessel;
   a second shaft aligned with said first shaft;
   annular cup-shaped housing means fixed to said second shaft which surrounds and is radially spaced from said gas barrier means;
   a second plurality of permanent magnets mounted in said housing means, aligned with said first magnets and radially spaced from said gas barrier means; and
   centrifugal blower means fixed to said housing means for drawing air through the space between said second magnets and said gas barrier means to cool said gas barrier means.

2. A magnetic drive coupling according to claim 1, wherein said first support means comprises
   a flange portion sealed to the vessel exterior wall about an opening therein;
   a cylindrical portion connected to and extending from said flange portio and extending through the vessel wall opening and into the vessel interior, said cylindrical portion having an axial bore therethrough; and
   a pair of bearings mounted in said bore for rotatably supporting said one end of said first shaft.

3. A magnetic drive coupling according to claim 2, wherein said gas barrier means is hermetically sealed to said flange portion.

4. A magnetic drive coupling according to claim 2, wherein said gas barrier means is integrally formed with said flange portion.

5. A magnetic drive coupling according to claim 1, wherein said blower means comprises a pair of axially spaced, circular flanges which extend radially outwardly of said housing means, said flanges being interconnected by a plurality of circumferentially spaced vanes which extend radially outwardly in a spiral manner, the space between said flanges communicating with the space between said second magnets and said gas barrier means.

6. A magnetic drive coupling according to claim 1, wherein said gas barrier means is formed of a material selected from the group consisting of hastalloy, titanium, nichrome and stainless steel.

7. A magnetic drive coupling according to claim 1, where said first shaft is an output shaft and said second shaft is an input shaft which drives said output shaft.

8. A magnetic drive coupling for transmitting rotary power to the interior of a high pressure vessel having an exterior wall with an opening therethrough, comprising a bushing member having a flange portion sealed about the vessel exterior wall opening, a cylindrical portion extending from said flange portion, through the vessel wall opening and into the vessel interior, an axial bore through said flange and cylindrical portions, and a plurality of bearings in said bore;

an output shaft mounted in said bearings for rotation in said bore, said output shaft having one end extending into the vessel and another end extending outwardly of the vessel;

a plurality of permanent rotor magnet segments mounted about said output shaft other end and axially aligned therewith;

a cup-shaped non-magnetic high pressure gas barrier of high electrical volume resistivity hermetically sealed to vessel exterior wall and enveloping output shaft other end and said rotor magnet segments, an input shaft mounted externally of said barrier and axially aligned with said output shaft;

a cup-shaped housing fixed to said input shaft and receiving a major portion of said barrier therein;

a plurality of permanent drive magnet segments mounted to the interior of said housing, spaced radially outwardly of said barrier to form a gap therebetween, and arranged concentric to said rotor magnet segments for magnetic coupling therewith;

a pair of axially spaced, circular flanges which are fixed to and extend radially outwardly from said housing, said flanges being interconnected by a plurality of circumferentially spaced vanes which extend radially outwardly, said flanges and said vanes forming centrifugal blower means for drawing air along said barrier and through said gap to cool said barrier.

9. A magnetic drive coupling according to claim 8, wherein said gas barrier is hermetically sealed to said flange portion.

10. A magnetic drive coupling according to claim 8, wherein said gas barrier is integrally formed with said flange portion.

11. A magnetic coupling according to claim 8, wherein said gas barrier is formed of a material selected from the group consisting of hastalloy, titanium, nichrome and stainless steel.

12. A magnetic coupling according to claim 8, wherein said circumferentially spaced vanes extend radially outwardly in a spiral manner.

* * * * *